United States Patent
Gloor et al.

(10) Patent No.: US 8,127,959 B2
(45) Date of Patent: Mar. 6, 2012

(54) CLOSING DEVICE FOR A FILLER NECK DISPOSED ON A CONTAINER

(75) Inventors: Christian Gloor, Sevelen (CH); Hubert Meier, Wohlenschwil (CH); Walter Furgler, Mels (CH); Daniel Pieth, Maladers (CH); Ekkehard Mosberger, Maienfeld (CH)

(73) Assignee: STAG AG, Maienfeld (CH)

( * ) Notice: Subject to any disclaimer, the term of this patent is extended or adjusted under 35 U.S.C. 154(b) by 1046 days.

(21) Appl. No.: 12/064,709

(22) PCT Filed: Aug. 14, 2006

(86) PCT No.: PCT/CH2006/000430
§ 371 (c)(1),
(2), (4) Date: Feb. 25, 2008

(87) PCT Pub. No.: WO2007/022652
PCT Pub. Date: Mar. 1, 2007

(65) Prior Publication Data
US 2008/0190929 A1 Aug. 14, 2008

(30) Foreign Application Priority Data

Aug. 23, 2005 (CH) ........................ 1375/05
Dec. 1, 2005 (CH) ........................ 1908/05

(51) Int. Cl.
*B65D 55/00* (2006.01)
(52) U.S. Cl. .................... 220/211; 220/232; 141/362
(58) Field of Classification Search .................. 220/211, 220/225, 232, 254.6, 254.4, 86.2; 141/360, 141/362, 383, 386
See application file for complete search history.

(56) References Cited

U.S. PATENT DOCUMENTS

| | | | | | |
|---|---|---|---|---|---|
| 2,818,992 | A | * | 1/1958 | Ekola | 220/232 |
| 3,178,779 | A | * | 4/1965 | Clark et al. | 277/646 |
| 3,240,038 | A | * | 3/1966 | Schwegler | 68/24 |
| 3,325,042 | A | * | 6/1967 | Brown | 220/232 |
| 3,788,651 | A | * | 1/1974 | Brown et al. | 277/646 |
| 4,566,375 | A | * | 1/1986 | van der Schoot | 99/348 |
| 6,095,365 | A | * | 8/2000 | Yielding | 220/264 |
| 6,651,708 | B2 | * | 11/2003 | Gloor et al. | 141/360 |
| 7,837,050 | B2 | * | 11/2010 | Maybury, Jr. | 220/211 |
| 2005/0166458 | A1 | | 8/2005 | McKenzie et al. | |

FOREIGN PATENT DOCUMENTS

EP 440064 A1 * 8/1991
WO WO 02/074581 9/2002

* cited by examiner

*Primary Examiner* — David Fidei
(74) *Attorney, Agent, or Firm* — Henry M. Feiereisen; Ursula B. Day

(57) ABSTRACT

The invention relates to a closing device for a filler neck situated on a container, in particular for a container situated on a rail or road vehicle, which may be supplied to a loading station for loading with powdered or granular bulk goods. At least one filler neck (3), which is provided with a through opening and connected to the container interior (6), and a pivot device (30), which comprises two pivot arms (31, 61) mounted thereon, are situated on the container (5), using which two closure elements (35, 60) situated thereon are pivotable in relation thereto around a shared axis (Z) for the exterior and interior closing or opening of the through opening. At least one seal, which is provided with a pressure chamber oriented around the circumference, for example, and which may be impinged with pressure in the closed position and relieved of pressure to pivot the closure elements, is situated on the closure elements (35, 60) and/or on the filler neck (3).

16 Claims, 9 Drawing Sheets

CLOSING DEVICE FOR A FILLER NECK DISPOSED ON A CONTAINER

BACKGROUND OF THE INVENTION

The invention relates to a closing device for a filler neck disposed on a container, in particular for a container situated on a rail or road vehicle and implemented for loading with powdered or granular bulk goods, which has at least one filler neck, which is provided with a through opening and connected to the container interior, a pivot device, as well as a first closure element and a second closure element for external and internal closing or opening of the through opening.

A container situated on a rail or road vehicle and able to be supplied to a storage container (silo) for loading powdered or granular bulk goods is known from the publication (WO 02/074581 A1), which has two filler necks, situated on the top side at a distance to one another and each connected via a through opening to the interior of the container, for example, which are each provided with a closing device situated thereon. The individual closing device comprises a cover hood, which is mounted on the exterior of the filler neck and is pivotable in relation thereto, and a closure element in the interior which is pivotable in relation to the through opening around the vertical axis of a pivot device. To load the individual container, firstly the cover hood (weather guard) situated on the filler neck is removed or pivoted off in relation to the filler neck and subsequently the internal closure element is manually pivoted using auxiliary aids around the vertical axis of the pivot device. Subsequently, a charging head connected to a silo container is inserted into the through opening of the filler neck and/or into the interior of the container and removed again after the loading. In the known container, the problem exists that the cover hood and the closure element are each to be actuated manually before the loading and after the loading of the container even in the event of extreme external conditions (winter operation), so that relatively costly safety devices are to be provided on the container for walking thereon.

SUMMARY OF THE INVENTION

The invention is based on the object of providing a closing device, implemented for actuating the externally and internally situated closure elements, for the filler neck situated on a container of the species cited at the beginning, which overcomes the disadvantages of the cited prior art and, using suitable means, ensures a relative movement of the two closure elements oriented and controlled in relation to the filler neck as well as exact sealing thereof in relation to the filler neck.

The closing device according to the invention is characterized in that the closure elements are pivotable horizontally around a shared vertical axis of the pivot device, which is operationally linked to activatable drive means, in relation to the through opening of the filler neck, and a seal is situated in each case on the closure elements and/or the filler neck, at least one seal having a pressure chamber, which is oriented around the circumference and is connected to at least one connection element and one supply line, which may be impinged by pressure in the closed position and may be relieved of pressure for the open position of the closure elements.

An activatable and largely automatic pivot movement of the two closure elements as well as exact sealing and thus extensive automation of the loading procedure are achieved advantageously by the closing device according to the invention and using the seals which may be impinged by pressure and/or lowering and pressing the external closure element on a manhole seal using a compression spring. The pivot movement of the two closure elements may also be performed by transmitting a signal which activates the closing device, for example, from a location-independent transmitter.

In a further design, the closure elements are situated on the vertical axis and operationally linked thereto in such a way that they are pivotable simultaneously and in relation to the through opening of the filler neck.

Furthermore, it is advantageous that the seals situated in the closure element and/or in the insert body of the filler neck are inserted replaceably in the correspondingly implemented recesses and are fastened by at least one screw connection situated on the circumference of the seal.

Further features, advantages, and expedient refinements of the invention result from the following description and the patent claims.

BRIEF DESCRIPTION OF THE DRAWING

Exemplary embodiments of the invention are described in the following on the basis of the drawings.

DETAILED DESCRIPTION OF PREFERRED EMBODIMENTS

Figure 1:
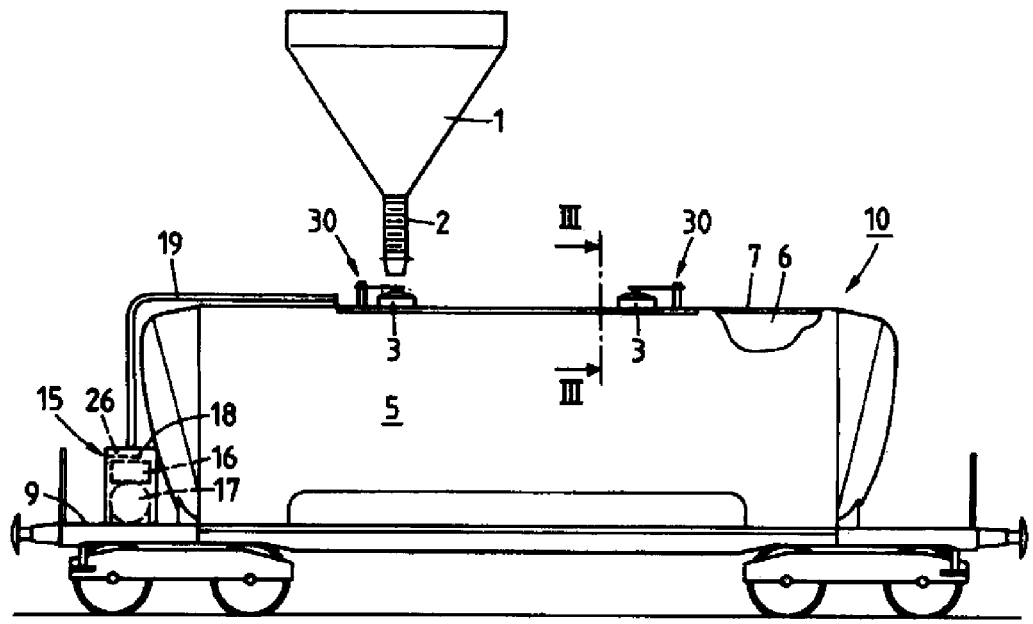
FIG. 1 shows a schematic view of a rail vehicle supplied to the silo container of a bulk good loading station having a container situated thereon.

FIG. 1 shows the schematically illustrated silo container of a bulk good loading station (not shown in greater detail), in particular for powdered or granular bulk goods. In the exemplary embodiment shown, a container 5 situated on a rail vehicle 10 is supplied to the silo container 1 for loading with the bulk goods. In a variant which is not shown, the container 5 may also be situated on a road vehicle which may be supplied to the loading station.

The container 5 shown in projection in FIG. 1 has two filler necks 3 situated at a distance to one another in the axial direction, for example, which are each implemented for insertion of a loading head 2 situated on the silo container 1. The individual filler necks 3 are connected via a through opening (not shown in FIG. 1) to the container interior 6. A closure element which is situated on the exterior in relation to the container interior 6 and/or on the container wall 7 as well as a closure element situated in the interior (not shown in greater detail in FIG. 1) are provided on each filler neck 3 for closing and opening the through opening. The closure elements are each situated on a pivot device 30 schematically illustrated in FIG. 1 and are pivotable around a vertical axis in the horizontal plane in relation to the through opening of the filler neck 3. The pivot movement of the closure elements for exterior and interior opening or closing of the through opening preferably occurs simultaneously. The closure element situated on the exterior of the container 5 and fastened to the pivot device 30 is preferably implemented as a weather guard.

An operating unit 15, which is schematically illustrated and provided with a compressed air container 17, a power source 16, and an actuatable electrical switch device 26 is situated on the platform 9 at one end of the rail vehicle 10. The compressed air container 17 and the power source 16 as well as the switch device 26 are situated in a housing 18 and are each supplied via a network connection (not shown) with compressed air or electrical power. For example, a compressed air bottle having a volume of 50 l and 200 bar is used as the power source. Furthermore, a line duct 19 extending upward up to the container 5 is situated on the housing 18, which is implemented so it is lockable. Pneumatic and electrical supply lines, which are connected on one hand to the compressed air container 17, the power source 16, and the switch device 26 and on the other hand to the filler neck 3 and the pivot device 30, are situated in the line duct 19.

Figure 2:
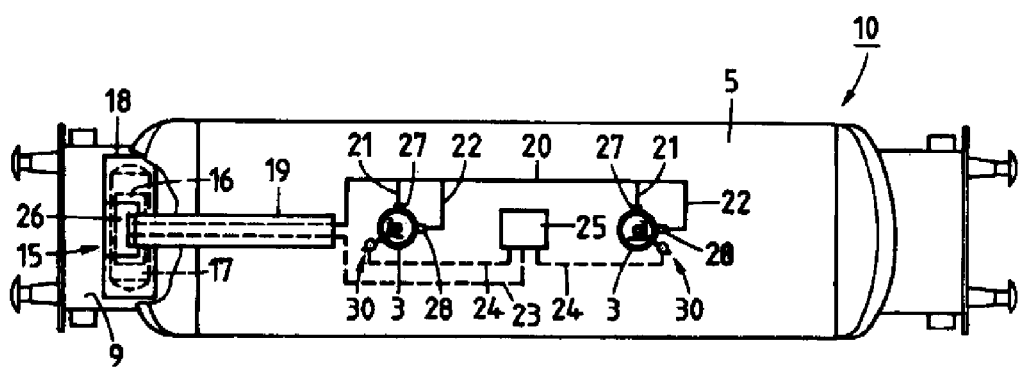
FIG. 2 shows a top view of the vehicle from FIG. 1 having the container and two filler necks situated thereon at a distance to one another.

FIG. 2 shows a schematic top view of the rail vehicle 10 having the container 5 and the two filler necks 3 situated at a distance to one another. Furthermore, the operating unit 15 having the housing 18 is shown situated on the platform 9. The compressed air container 17, the power source 16, and the switch device 26 are situated in the housing 18, which are each connectable to a supply system of the loading station (not shown in greater detail) for the power supply. The compressed air container 17 is connected via a supply line 20 situated in the line duct 19 and via connection lines 21, 22 and connection elements 27, 28 situated thereon to the two closure elements. The power source 16 is connected, for example, via an electrical supply line 23 to a control unit 25 preferably situated on the top of the container 5. The control unit 25, which is activatable using a remote control (not shown), for example, is connected via an electrical line 24 to the pivot device 30. The closure elements of the two filler necks 3 are preferably actuated simultaneously to open and/or close the through openings. A separate, pressure-controlled actuation of the closure elements is also possible, however.

Figure 3:
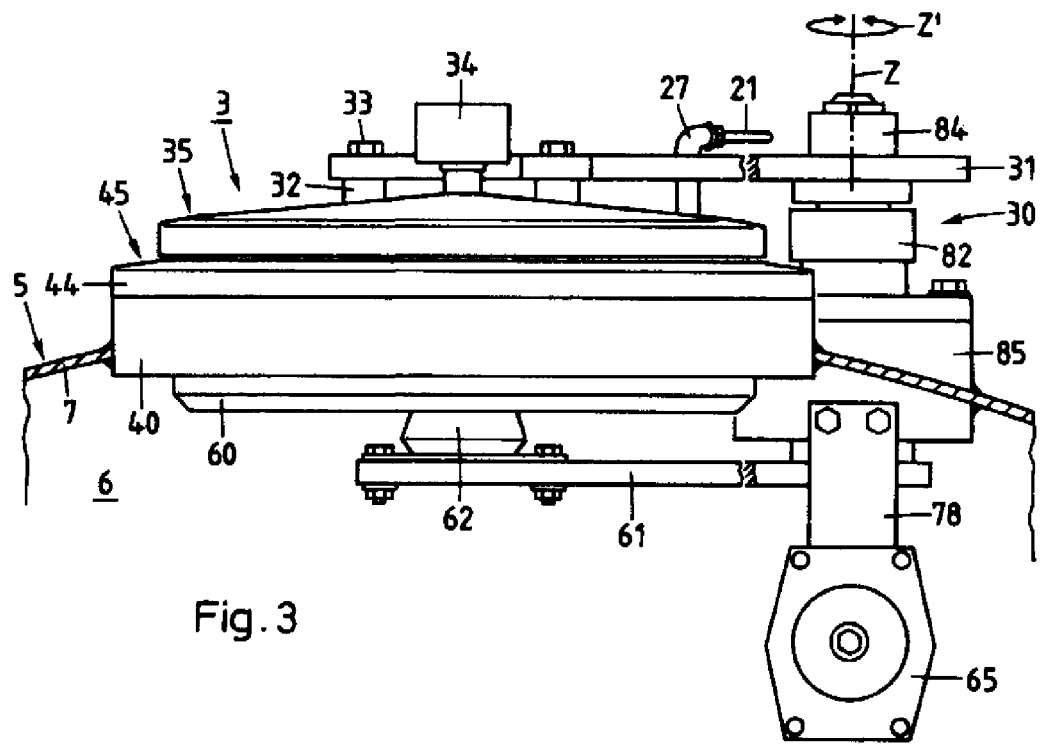
FIG. 3 shows the container from FIG. 1 in partial section along line III-III having the filler neck and a pivot device situated thereon for two closure elements movable in relation to the filler neck.

FIG. 3 shows a part of the container 5, shown in partial section, having the filler neck 3 fastened on the container wall 7 and illustrated in a view. The filler neck 3 comprises a pipe neck 40 welded into the container wall 7 as well as an insert body 45 insertable into the pipe neck 40 and provided with a support ring 44. Furthermore, the pivot device 30, which is assigned to the filler neck 3, for the two closure elements 35 and 60 pivotable in the horizontal plane is shown. The first closure element 35, which is situated on the exterior of the filler neck 3 and is situated using screws 33 and spacer sleeves 32 on a first pivot arm 31, is preferably implemented as a weatherproof cover hood. Furthermore, a ventilation filter 34 is situated on the first closure element 35. The second closure element 60 situated on the interior of the filler neck 3 is mounted on a second pivot arm 61 of the pivot device 30 using an adapter element 62. The pivot device 30 having the individual elements, which is shown in a view in FIG. 3 and is mounted in a head part 85 fastened on the container wall 7, is described in detail later in connection with FIG. 6.

Figure 4:
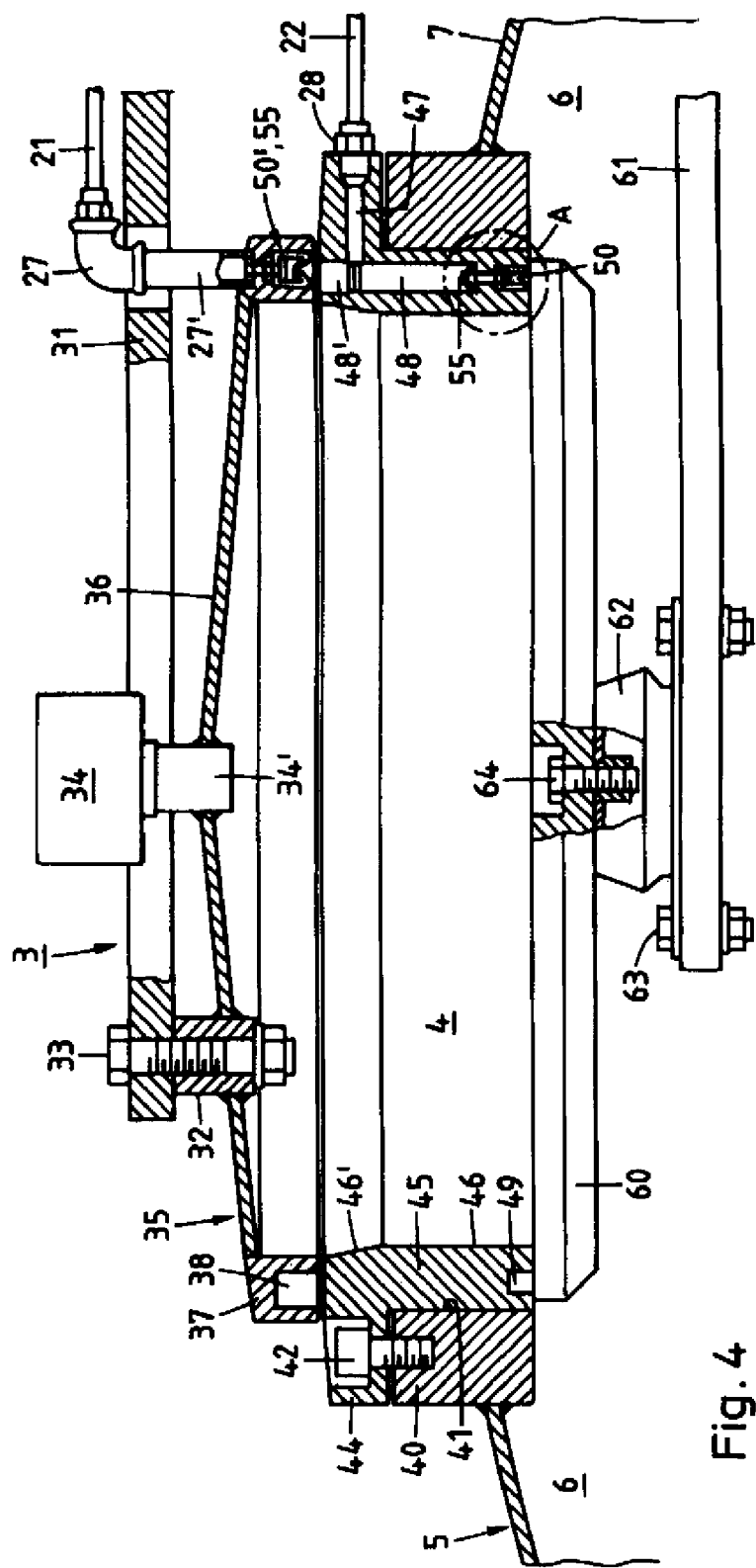
FIG. 4 shows the filler neck from FIG. 3 in section having the closure elements situated on the exterior and interior, respectively.

The filler neck 3 is illustrated in section in FIG. 4 and a part of the container 5 having the pipe neck 40 situated thereon, as well as the first closure element 35, which is engaged therewith and mounted on the first pivot arm 31, and the second closure element 60, which is operationally linked to the second pivot arm 61, may be seen. The adapter element 62 is situated and fastened using screws 63, 64 on the second pivot arm 61 for mounting the closure element 60.

The first closure element 35 is fastened to the first pivot arm 31 and operationally linked thereto using the spacer bushings 32 and screws 33. The first closure element 35 has a ring body 37 and a cover hood 36 situated and fastened thereon. The cover hood 36 is preferably implemented as a relatively flat weather guard in the form of a conical roof. The ventilation filter 34, which has a neck 34' projecting into the through opening 4 and is fastened using means which are not shown, is situated on the cover hood 36. The ring body 37 is also implemented having a recess 38 oriented around the circumference to receive a seal 50' implemented as a circular ring. The seal 50' schematically and partially illustrated in FIG. 4 may be impinged by compressed air and is connected via at least one connection nozzle 55 situated thereon and via a pipe part 27' and the connection element 27, implemented as a pipe elbow, to the line 21 connected to the compressed air supply line 20 (FIG. 2).

The pipe neck 40, which is illustrated in FIG. 4 and fastened on the container wall 7 of the container 5, has a cylindrical cavity 41, which is implemented to receive the insert body 45, which is provided with the through opening 4 and a support ring 44. The insert body 45 is fastened to the pipe neck 40 using screws 42 distributed around the circumference of the support ring 44. The insert body 45 has a cylindrical internal wall 46 forming the through opening 4 as well as an internal wall 46' implemented as conically expanding in the direction of the first closure element 35. The insert body 45 is provided with a recess 49, which is oriented around the circumference and is implemented to receive a seal 50, on the side facing toward the second closure element 60.

The seal 50 partially and schematically shown in FIG. 4 may also be impinged by compressed air and is connected via at least one connection nozzle 55 situated thereon and via a first hole 48 situated in the insert body 45 and a second hole 47 oriented transversely thereto, using the connection element 28, which is situated on the support ring 44 and implemented as a screw neck, to the line 22 connected to the compressed air supply line 20 (FIG. 2). The first hole 48 is closed at the upper end by a seal stopper 48' screwed into the support ring 44.

Figure 5:
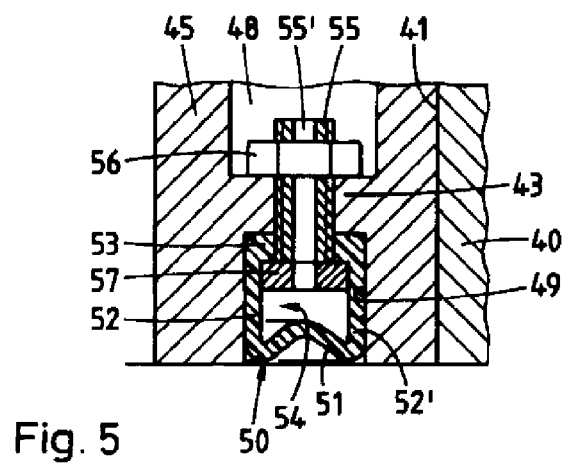
FIG. 5 shows an enlarged view of a part of the filler neck, identified by a circle A in FIG. 4, having a seal situated thereon.

FIG. 5 shows a part of the pipe neck 40, identified in FIG. 4 by a circle A and shown enlarged and in section, having the insert body 45 situated in the cylindrical cavity 41 and provided with the recess 49 for the seal 50. The seal 50, which is shown in profile cross-section in FIG. 5 and is provided with a pressure chamber 54, comprises two side walls 52 and 52' situated at a distance to one another, an upper floor 53 connecting these walls to one another and a lower floor 51 situated at a distance thereto. The lower floor 51 is implemented as curved inward somewhat in the direction of the pressure chamber 54 and is elastically deformable upon pressure impingement of the pressure chamber 54 to press against the element facing toward it (support ring 44 and/or closure element 60) to form a seal. The pressure chamber 54 is connected via a hole 55', which penetrates the connection nozzle 55, to the hole 48, which is provided in the insert body 45 and may be impinged with compressed air. The connection nozzle 55 situated on the seal 50 is provided at one end with a contact disk 57 situated in the pressure chamber 54 and is fastened at the other end using a screwed-on nut 56 to the intermediate wall 43 of the insert body 45 provided between the hole 48 and the recess 49 of the insert body.

It is to be noted here that the seal 50' situated on the first closure element 35 in the circular recess 38 and the seal 50 situated on the second closure element 60 in the circular recess 49 are implemented essentially similarly.

Figure 6:
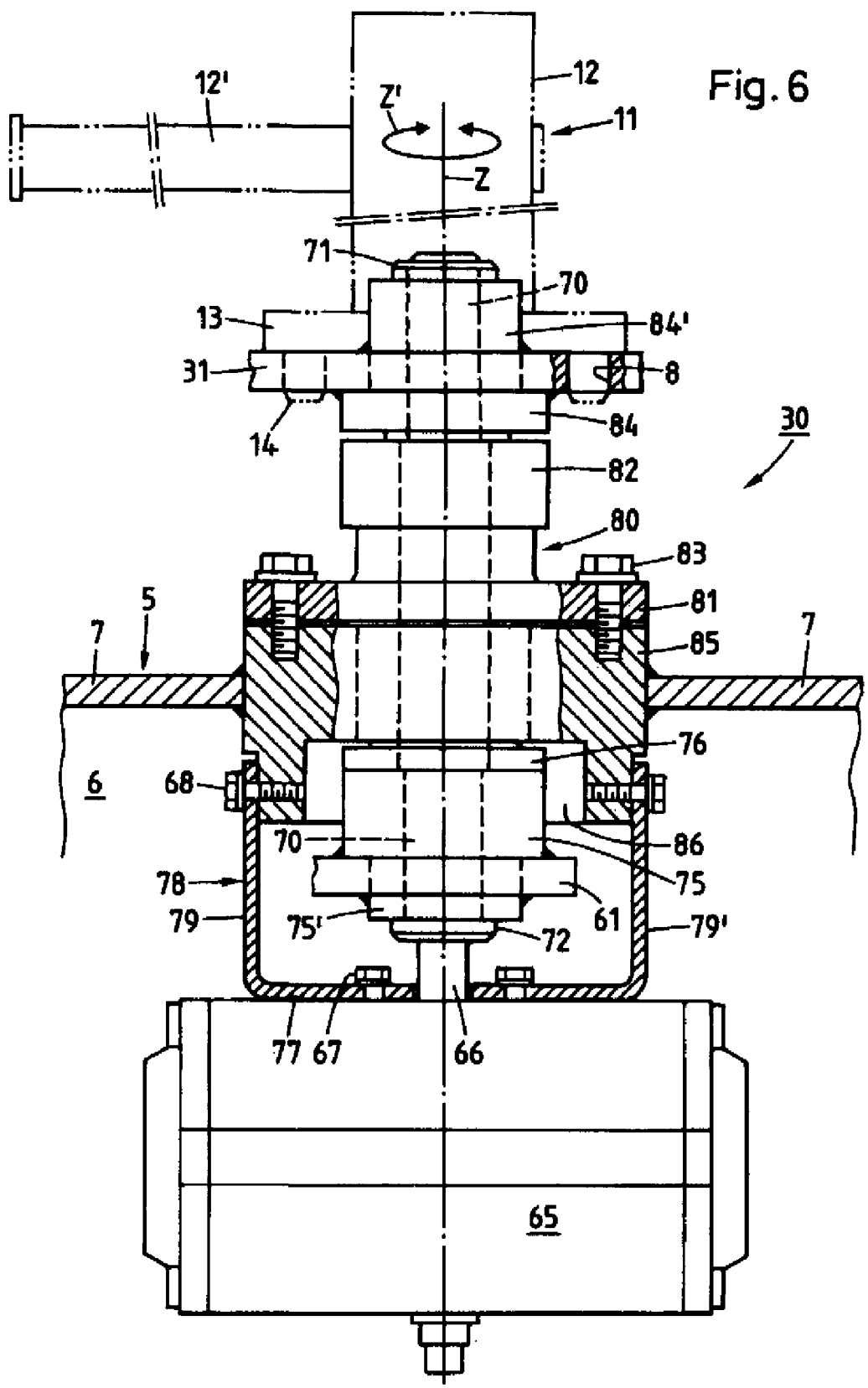
FIG. 6 shows an enlarged view in partial section of a first exemplary embodiment of the pivot device for the closure elements.

FIG. 6 shows a horizontal projection in partial section of the pivot device 30 as a first exemplary embodiment, which is mounted in the head part 85 fastened to the container wall 7 of the container 5 and is operationally linked to a rotational drive 65 situated in the container interior 6. The pivot device 30 comprises a guide housing 80, which is situated in the head part 85 and is implemented for coaxial mounting of an axle body 70. The guide housing 80 is mounted using a flange 81 on the head part 85 and fastened using screws 83.

A first bearing body 84 is situated at one end of the axle body 70, which has a set-back part 84' for mounting and fastening the first pivot arm 31 and is held on the axle body 70 using a snap ring 71. The first bearing body 84 having the first pivot arm 31 situated thereon is operationally linked to the axle body 70 (using means which are not shown) and is pivotable therewith around the vertical axis Z thereof in arrow direction Z'. Seal elements (not shown in greater detail), which are operationally linked to a compression spring, and which are retained at the upper end by a union nut 82 and at the lower end by a disk 76 situated on the axle body 70, are situated in the guide housing 80. A second bearing body 75, which is retained using a clip ring 72 on the axle body 70 and is provided with a set-back part 75' for fastening the second pivot arm 61, is situated at the lower end of the axle body 70 in a recess 86 of the head part 85.

The rotational drive 65, which is operationally linked in a way not shown in greater detail via an axle pin 66 to the axle body 70 of the pivot device 30, is fastened to a retention element 78 using screws 67. The retention element 78, which is implemented as essentially U-shaped in profile cross-section, comprises a floor 77 and two side walls 79, 79' molded laterally thereon and situated at a distance to one another, and is fastened using screws 68 to the head part 85, which is provided with a lateral contact surface (not shown in greater detail). The second pivot arm 61, which is situated and fastened on the second bearing body 75, is pivotable around the vertical axis Z of the axle body 70 according to arrow direction Z', as schematically illustrated in FIG. 9, between the two side walls 79, 79'.

It is to be noted here that the movement of the axle body 70 and the elements operationally linked thereto oriented around the vertical axis Z in the arrow direction Z' occurs using the activatable rotational drive 65. In the event of possible malfunctions, the rotational movement of the elements may also be performed using an auxiliary device 11 schematically illustrated in FIG. 6, which comprises an add-on element 12 having lever 12' situated thereon and a contact plate 13 having at least two pins 14 fastened thereon, which, to achieve manual actuation of the pivot device 30, engage in corresponding holes 8, 8' provided on the first pivot arm 31 and situated at a distance to one another, as shown in FIG. 7.

Figure 7:
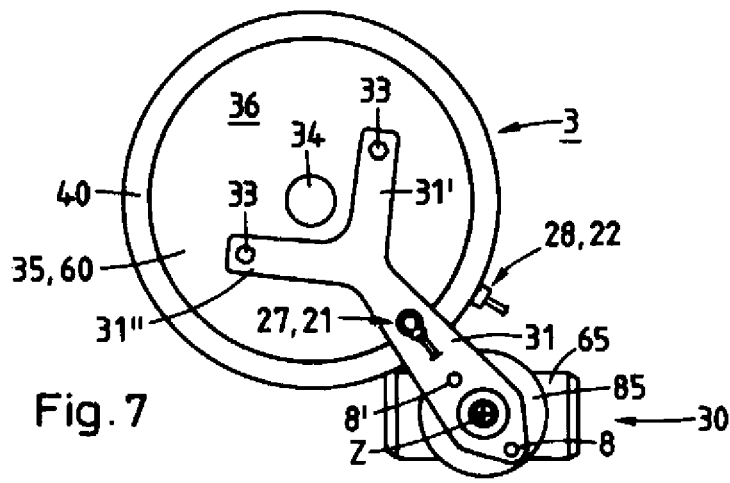
FIG. 7 shows a schematic top view of the filler neck having the pivot device and the two closure elements, both shown in the closed position.

FIG. 7 shows a top view of the filler neck 3 and the pipe neck 40 with the two closure elements 35 and 60 operationally linked to the pivot device 30 and illustrated in a closed position. The first pivot arm 31, which is operationally linked to the rotational drive 65, is situated on the pivot device 30. On the front end, the first pivot arm 31 is fastened to the exterior of the cover head 36 of the closure element 35 using two parts 31' and 31", situated spread apart from one another, and screws 33. The ventilation filter 34 is situated between the two parts 31' and 31" and fastened to the closure element 35. Furthermore, the pipe elbow 27 having the line 21, which is situated on the first closure element 35 (FIG. 4) and schematically illustrated, as well as the connection element 28 having the line 22 situated on the insert body 45 (FIG. 4) of the pipe neck 40 may be seen.

Figure 8:
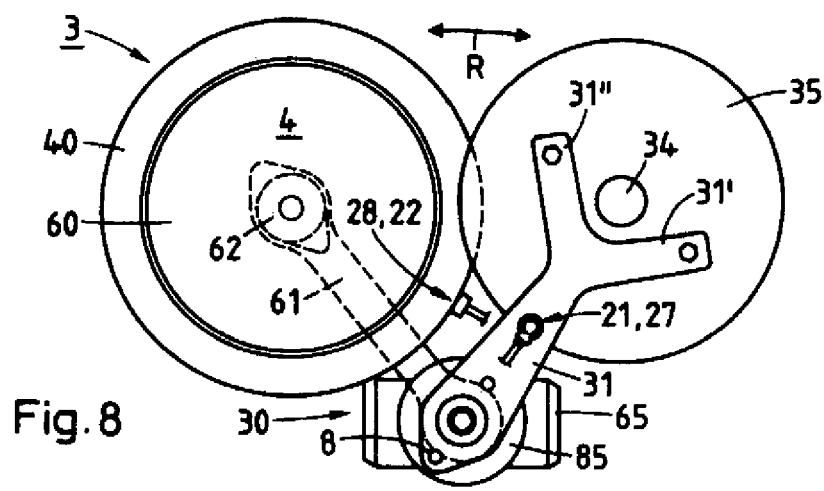
FIG. 8 shows the filler neck from FIG. 7 having the external closure element pivoted in relation thereto.
Figure 9:
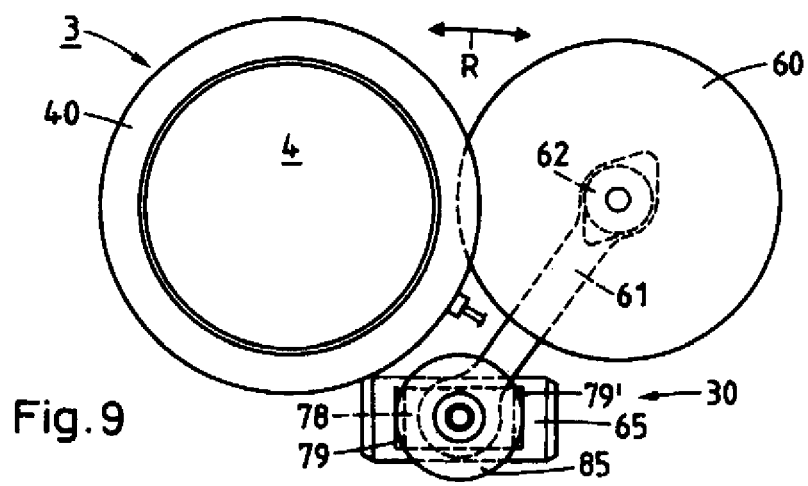
FIG. 9 shows the filler neck from FIG. 7 having the internal closure element pivoted in relation thereto.

The filler neck from FIG. 7 is shown in a top view in FIG. 8 and FIG. 9, in FIG. 8, the first closure element 35 situated on the first pivot arm 31 of the pivot device 30 and in FIG. 9 the second closure element 60 situated on the second pivot arm 61 of the pivot device 30 each being shown in the open position in relation to the through opening 4 of the pipe neck 40. As noted above, the pivot device 30 operationally linked to the rotational drive 65 is implemented in such a way that the two closure elements 35 and 60 are preferably pivotable simultaneously and in relation to the through opening 4 of the pipe neck 40 in the double arrow direction R using the two pivot arms 31 and 61 situated thereon. Furthermore, the retention element 78 for the rotational drive 65 situated on the head part 85 is shown in FIG. 9 and the support arm 61 pivotable between the two side walls 79, 79' may be seen.

Figure 10:
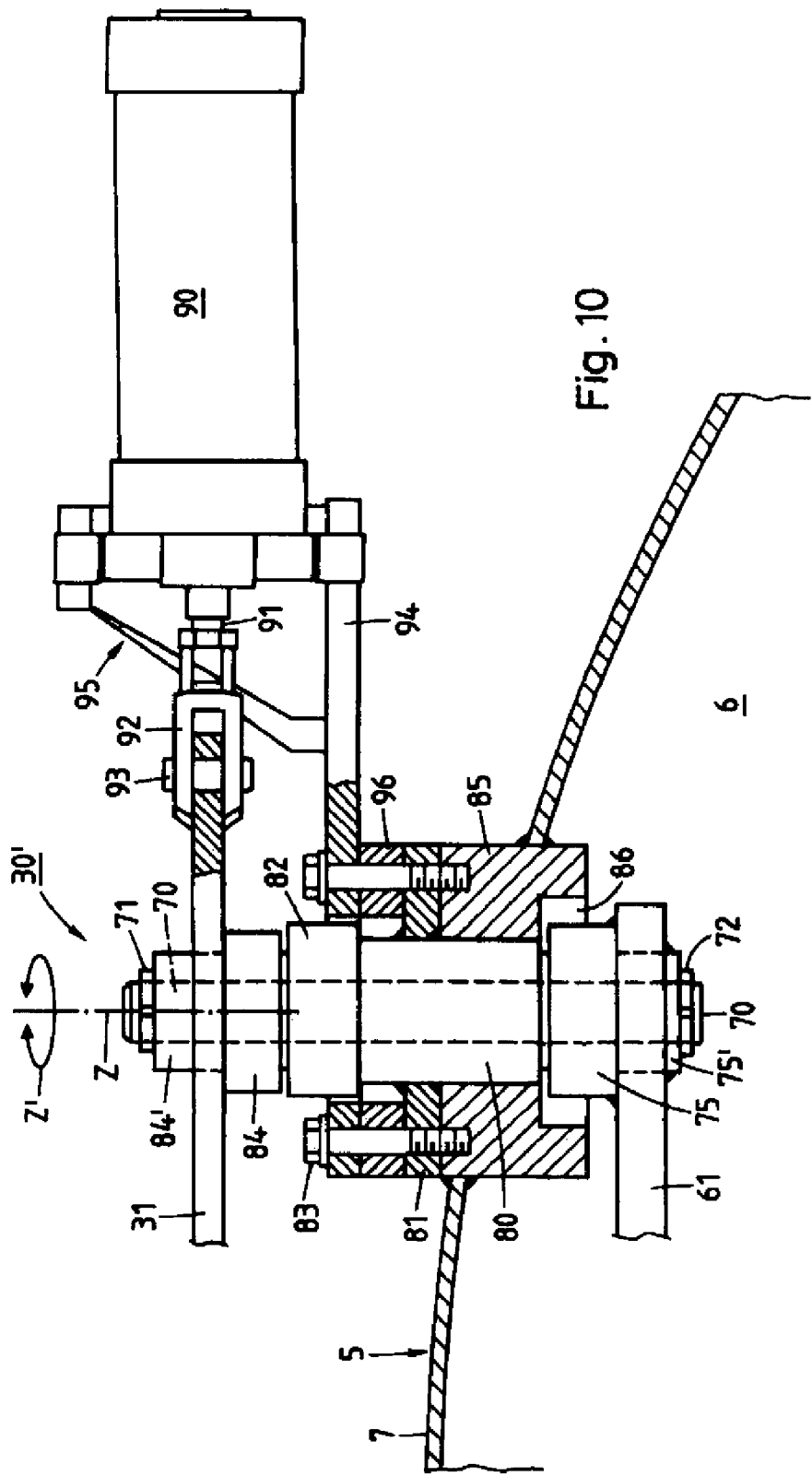
FIG. 10 shows a second exemplary embodiment of the pivot device, situated externally on the container, for the two closure elements.

FIG. 10 shows a second exemplary embodiment of the pivot device 30', shown in partial section, for a drive 90, and the head part 85 fastened on the container wall 7 of the container 5 as well as the guide housing 80 for the axle body 70 mounted therein may be seen. The guide housing 80, which is provided with the flange 81 and the union nut 82, an adapter part 96, and a support plate 94 are situated on the head part 85. The individual elements 80, 81 and 96, 94 are fastened to the head part 85 using the screws 83.

The first bearing body 84 is situated at one end of the axle body 70, which is provided with the set-back part 84' for mounting and fastening the first pivot arm 31 and is retained on the axle body 70 using the clip ring 71. The second bearing body 75 is situated on the other end of the axle body 70 in the recess 86 of the head part 85 and held on the axle body 70 using the clip ring 72. The second pivot arm 61 is situated and fastened on the set-back part 75' of the bearing body 70. The two bearing bodies 84 and 75 are operationally linked to the axle body 70 using means not shown in greater detail and are pivotable, together with the particular pivot arms 31 and 61 fastened thereon, around the vertical axis Z of the axle body 70 in the arrow direction Z'.

Notwithstanding the first exemplary embodiment in FIG. 6, in the second exemplary embodiment in FIG. 10, the drive means operationally linked to the first pivot arm 31 are situated on the container 5 and mounted on the support plate 94. The drive means comprise a pneumatically or hydraulically or electrically activatable drive 90, which is situated and fastened using means which are not shown on a bearing bracket 95 on the support plate 94, which is situated and fastened on the pivot device 30'. The drive 90, provided with an activatable piston rod 91, is operationally linked via a forked part 92 and a pin 93 to the first pivot arm 31.

Figure 11:
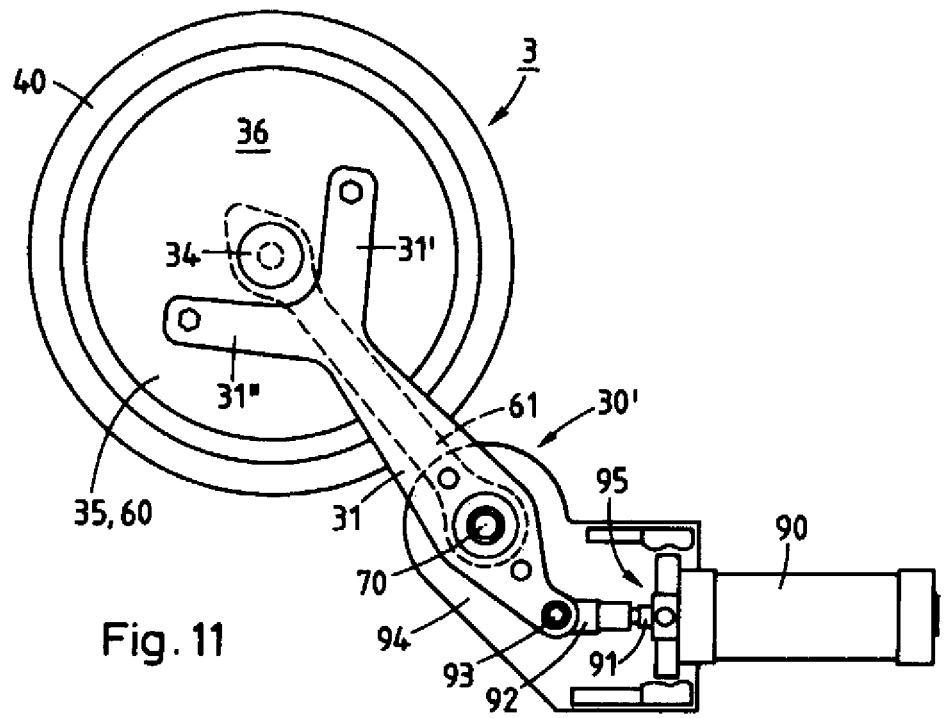
FIG. 11 shows a schematic top view of the filler neck from FIG. 10 having the closure elements shown in the closed position.

The filler neck 3 and the pipe neck 40 having the two closure elements 35 and 60, which are operationally linked to the pivot device 30' and are shown in the closed position, are shown in a top view in FIG. 11. The pivot arm 31, which is operationally linked to the drive 90 and is provided with the two parts 31' and 31" situated spread apart from one another, is situated on the pivot device 30' and fastened to the cover head 36 of the closure element 35. The ventilation filter 34 is situated between the two parts 31' and 31" and fastened to the external closure element 35.

Figure 12:
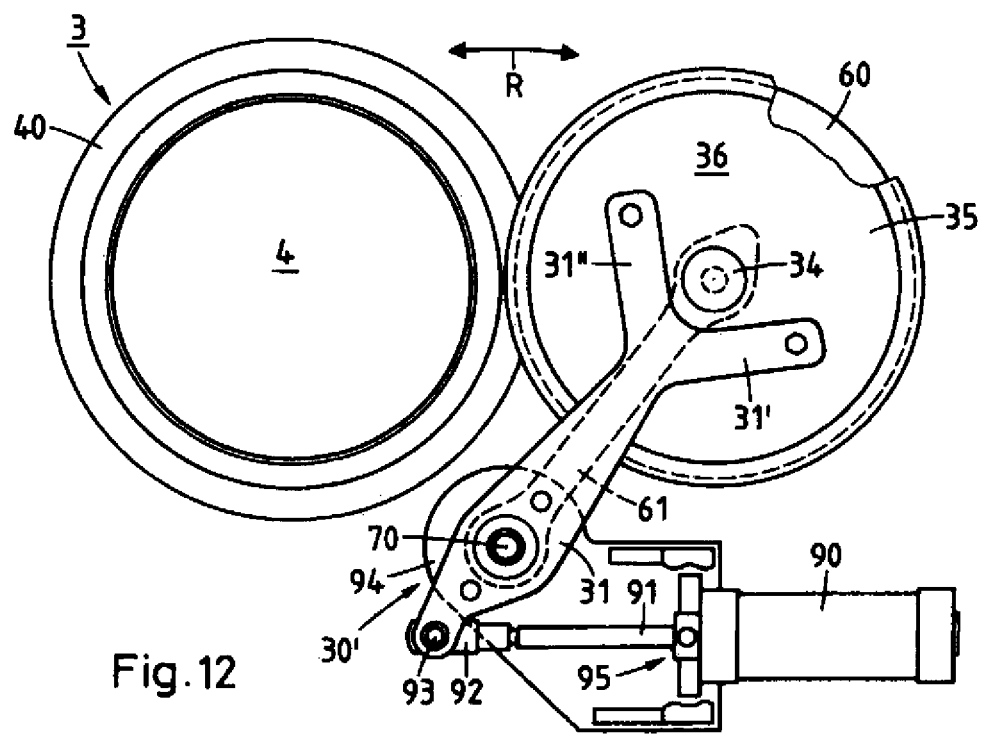
FIG. 12 shows the filler neck from FIG. 10 having the two closure elements pivoted in relation thereto in the open position.

FIG. 12 shows a top view of the filler neck 3 having the two closure elements 35 and 60 situated on the pivot arms 31 and 61, which are shown pivoted in relation to the pipe neck 40 and/or the through opening 4 as a result of the activated drive 90. As noted above, the pivot device 30' operationally linked to the drive 90 is implemented in such a way that the two closure elements 35 and 60 are pivotable, using the two pivot arms 31 and 61 situated thereon, preferably simultaneously and in relation to the through opening 4 of the pipe part 40 in the double arrow direction R.

Furthermore, the pivot device 30', shown in a top view, and the support plate 94 having the bearing bracket 95 for the drive 90 are shown in FIGS. 11 and 12. The axially displaceable piston rod 91 for the movement of the two pivot arms 31, 61 and the closure elements 35, 60 is shown in the final position in FIG. 12.

Figure 13:
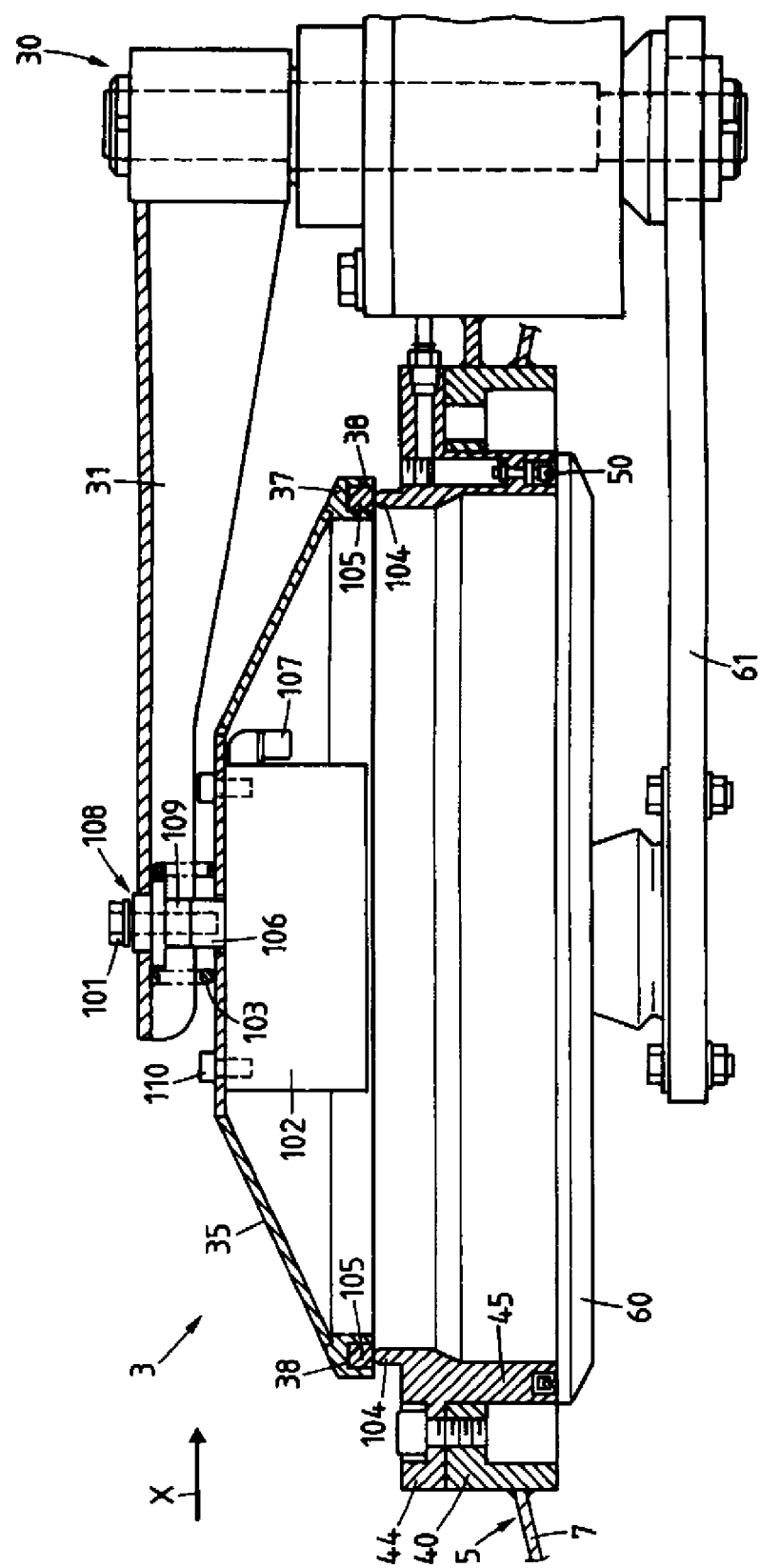
FIG. 13 shows an embodiment variant having an external closure element, which may be raised, in a schematic sectional view.

FIG. 13 shows a further exemplary embodiment of the closing device according to the invention, in which the external closure element 35 may be raised and lowered in relation to the support ring 44 of the filler neck 3 in the vertical direction. The internal closure element 60 and the pivot device 30 are identical to the embodiments described above.

FIG. 13 shows the filler neck 3 having the external closure element 35, which may be raised and lowered, in a schematic sectional view. The filler neck 3 comprises the pipe neck 40 welded into the container wall 7 as well as the insert body 45, which is insertable into the pipe neck 40 and provided with the support ring 44, and which has a circular collar 104 situated on the support ring 44 and projecting upward on the side facing toward the first closure element 35. In the lower edge area of the external closure element 35, the ring body 37 having the recess 38 oriented around the circumference, which is implemented to receive a seal 105, may be seen on the side facing toward the collar 104 of the support ring 44. A pneumatic cylinder 102, whose piston rod 106 projects vertically upward, is situated in the interior of the closure element 35. The upper end of the piston rod 106 is fastened to the first pivot arm 31 using a screw 101. The closure element 35 is thus operationally linked via the pneumatic cylinder 102 and its piston rod 106 to the first arm 31. A plug-in screw connection 107 is used for the compressed air supply (not shown in FIG. 13) of the pneumatic cylinder, preferably implemented as a short-stroke cylinder. A compression spring 103 is situated between the arm 31 and the closure element 35, which presses the closure element 35 away from the pivot arm 31 against the collar 104 of the support ring 44, so that the seal 105 of the closure element 35 is pressed against the collar 104 to form a seal. Furthermore, the pivot device 30, assigned to the filler neck 3, for the two closure elements 35 and 60 pivotable in the horizontal plane may be seen, which is identical to the pivot device already described above in connection with FIG. 6 and FIG. 10.

Figure 14:
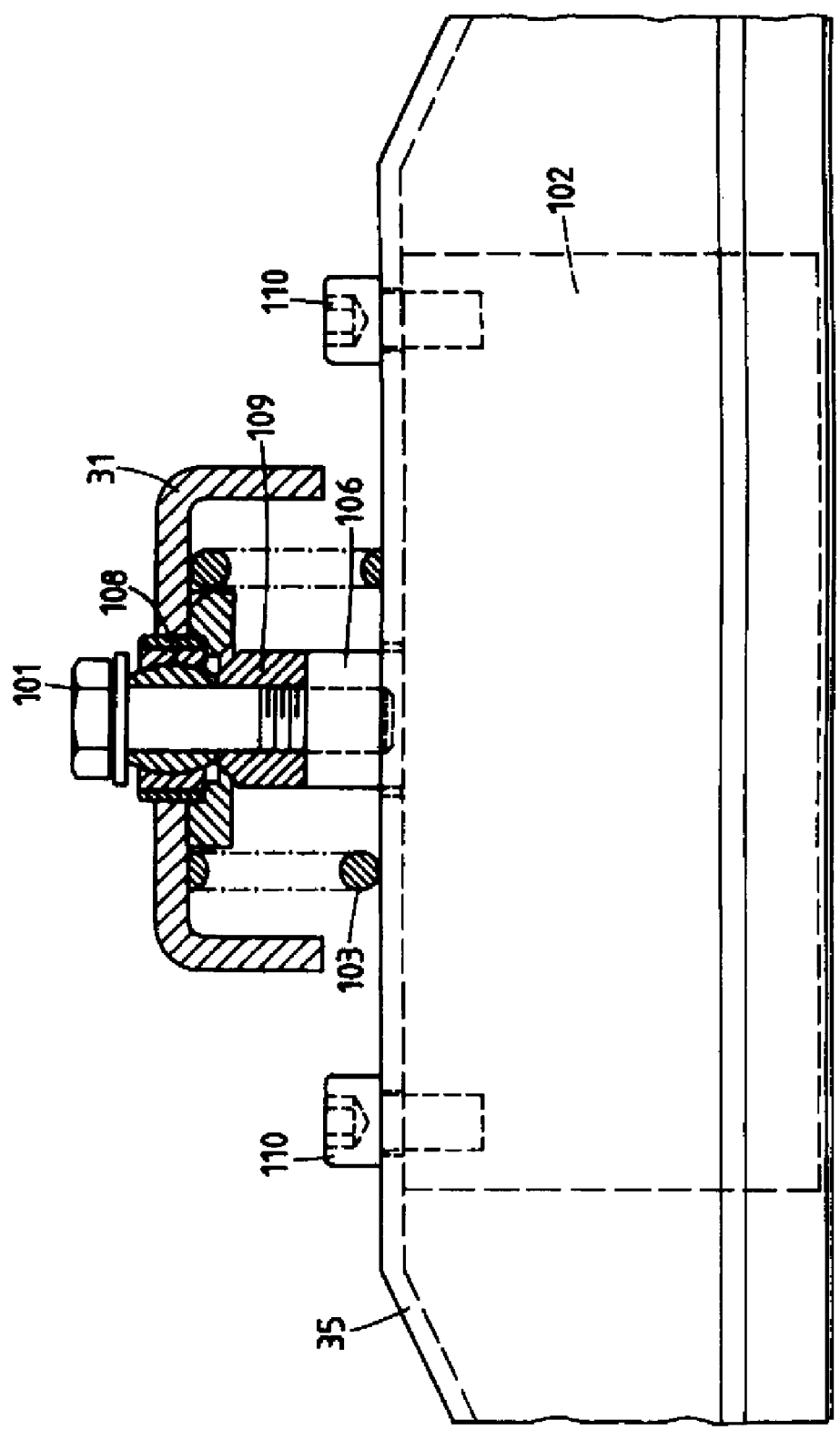
FIG. 14 shows a detail of the external closure element 35 illustrated in section in the X direction shown in FIG. 13.

FIG. 14 shows a detail of the external closure element 35 in the X direction shown in FIG. 13. In the upper flattened area of the closure element 35, the pneumatic cylinder 102 fastened thereon using screws 110 may be seen. The pivot arm 31 shown in section has a joint bearing 108, which is used to receive the screw 101, using which the piston rod 106 of the pneumatic cylinder 102, which projects vertically upward, is fastened. The compression spring 103 is situated between the bottom side of the pivot arm 31 facing toward the closure element 35 and the closure element 35. The pivot arm 31 is operationally linked to the closure element 35 via the piston rod 106 and the pneumatic cylinder 102 via the screw connection of the screw 101 and the spacer sleeve 109. The pneumatic cylinder 102 shown in the example is a double-action short-stroke pneumatic cylinder 102, which exerts a switch function working together with the compression spring 103. As soon as the pneumatic cylinder is impinged with pressure, the piston rod 106 moves in the direction of the cylinder. Because the piston rod 106 is connected fixed to the pivot arm 31, this movement causes raising of the closure element 35 against the restoring force of the compression spring 103 in the direction of the pivot arm 31. Upon evacuation of the pneumatic cylinder, the compression spring 103 presses the closure element 35 away from the pivot arm 31 in the direction of the support ring 4. This means that via a compressed air controller (not shown here), the closure element 35 may be raised and lowered between an upper and a lower position in relation to the circular collar 104 of the support ring 44.

During the opening and closing of the closing device shown in FIGS. 13 and 14, the external closure element 34 is raised using the compressed air controller. The seal 105 thus no longer rests on the collar 104. Furthermore, the pressure chamber 54 of the seal 50 provided for sealing the lower closure element 60 is relieved of pressure, by which the two closure elements 35, 60 are now pivotable horizontally using the pivot device 30 in relation to the through opening 4 of the filler neck 3. To close the through opening 4, the closure elements 35, 60 are positioned appropriately over the through opening 4 in the closed position. The external closure element 35 is lowered by the evacuation of the pneumatic cylinder 102. The compression spring 103 presses the closure element 35 downward and thus also the seal 105 against the collar 104 of the support ring 44. The through opening 4 is thus closed tightly from the outside. The pressure chamber 54 of the seal 50 is impinged with pressure, by which the lower closure element 60 also locks the through opening tightly from the inside.

Notwithstanding the exemplary embodiment shown in FIG. 4, the seal 105 situated in the closure element 35 is preferably implemented as a square four-edge sealing cord and is replaceably situated in the circular recess 38.

What is claimed is:

1. A closing device for a filler neck situated on a container, said container having at least one filler neck which is provided with a through opening and is connected to the container interior, said closing device comprising:
    a first closure element for closing or opening the through opening of the filler neck from the outside;
    a second closure element for closing or opening the through opening of the filler neck from the inside;
    a pivot device defining a vertical axis and operatively connected to the first and second closure elements for pivoting the first and second closure elements about the vertical axis in relation to the through opening of the filler neck;
    an activatable drive means for operating the pivot device; and
    seals respectively situated on each of the first and second closure elements, wherein at least one seal has a circumferential pressure chamber fluidly connected to a supply line, said pressure chamber being under pressure in a closed position of the closure elements and pressure-relieved in an open position of the closure elements.

2. The closing device of claim 1, further comprising a control unit situated on the container and activatable by a location-independent transmitter by transmitting a signal, said control unit being operationally linked to the pivot device for pivoting the closure elements about the vertical axis.

3. The closing device of claim 1, wherein the pivot device includes an axle body, two pivot arms arranged on the axle body in spaced-apart relationship for respectively supporting the closure elements, and a rotational drive, situated inside the container, for simultaneously pivoting the pivot arms about the vertical axis of the pivot device.

4. The closing device of claim 1, wherein the pivot device includes an axle body, two pivot arms arranged on the axle body in spaced-apart relationship for respectively supporting the first and second closure elements, and a drive, situated externally on the container, for simultaneously pivoting the pivot arms about the vertical axis of the pivot device.

5. The closing device of claim 4, wherein the drive is implemented as a fluid-operated pressure cylinder which is acted upon by fluid and discharges fluid for relief.

6. The closing device of claim 1, further comprising an insert body coaxially received in a pipe neck of the filler neck, said insert body having a support ring on a side facing the first closure element for a first one of the seals, and a circumferential recess on a side facing the second closure element for a second one of the seals, said second seal being the at least one seal provided with the pressure chamber, said pressure chamber having a circular configuration.

7. The closing device of claim 6, wherein the first closure element comprises a cover hood to provide a weather guard shaped like a conical roof, and a ring body, which, on a side facing the support ring, has a circumferential recess for the first seal, said first seal provided with a circular pressure chamber or is implemented as a square four-edge sealing cord.

8. The closing device of claim 7, wherein the first and second seals have multiple connection nozzles arranged in circumferential spaced-apart relationship for respectively fastening the seals to the ring body of the first closure element and the insert body in the pipe neck.

9. The closing device of claim 7, wherein the first and second seals are respectively situated replaceably in the recess of the ring body and in the recess of the insert body (45).

10. The closing device of claim 7, wherein the first and second seals are connected via a plurality of circumferentially spaced-apart connection elements to the supply line.

11. The closing device of claim 6, further comprising means for vertically raising and lowering the first closure element, said insert body having an upwardly projecting collar on the support ring for the first seal on a side facing the first closure element, and the recess for the second seal on another side facing the second closure element.

12. The closing device of claim 11, wherein the means includes a compression spring applying a restoring force on the first closure element to urge the first closure element against the collar, and a short-stroke pneumatic cylinder for raising the first closure element in relation to the support ring in a direction of one of the pivot arms.

13. The closing device of claim 11, wherein the second seal has multiple connection nozzles, arranged in circumferential spaced-apart relationship and connected to the pressure chamber, for fastening the second seal to the insert body in the pipe neck.

14. The closing device of claim 6, wherein the second seal is situated replaceably in the recess of the insert body.

15. The closing device of claim 6, wherein the second seal is connected to the supply line via multiple connection elements in circumferentially spaced-apart relationship.

16. The closing device of claim 11, wherein the first seal is a circular sealing cord implemented as square in profile cross-section.

* * * * *